Nov. 1, 1966         F. L. KINNE         3,282,430
             IRRIGATION CHANNEL WEED SEED SCREEN
                  Filed Aug. 16, 1963
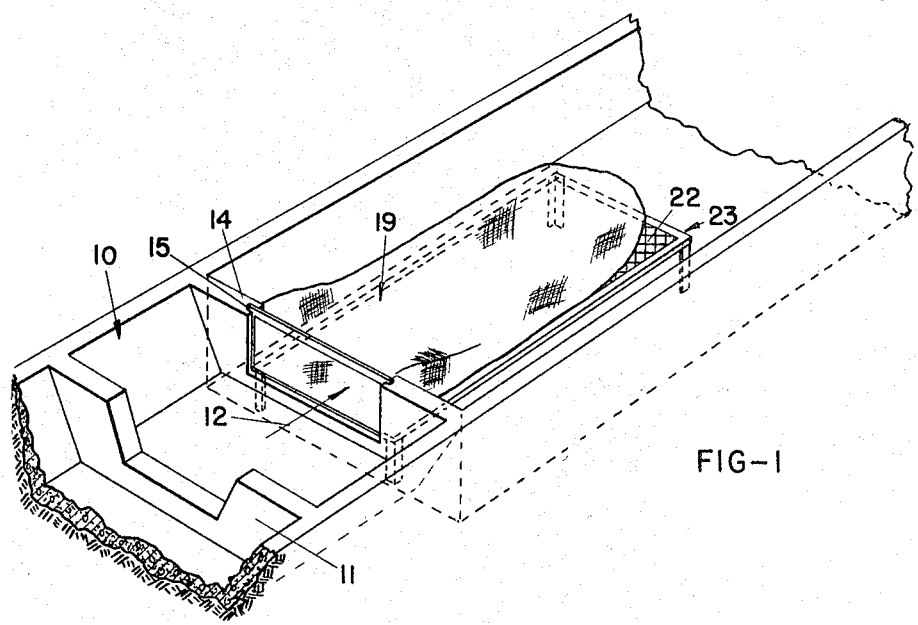
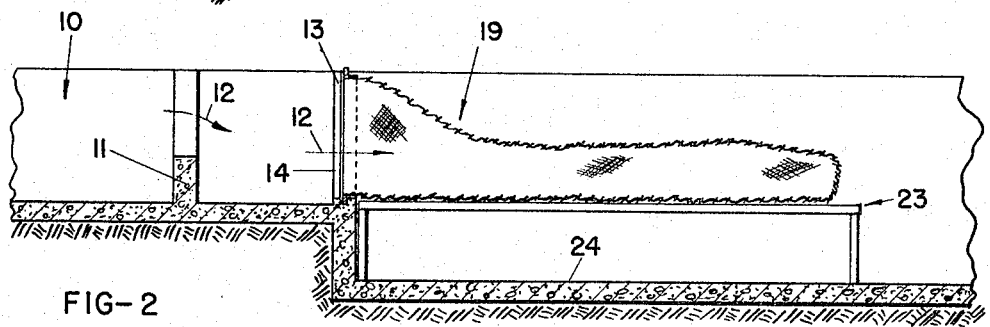
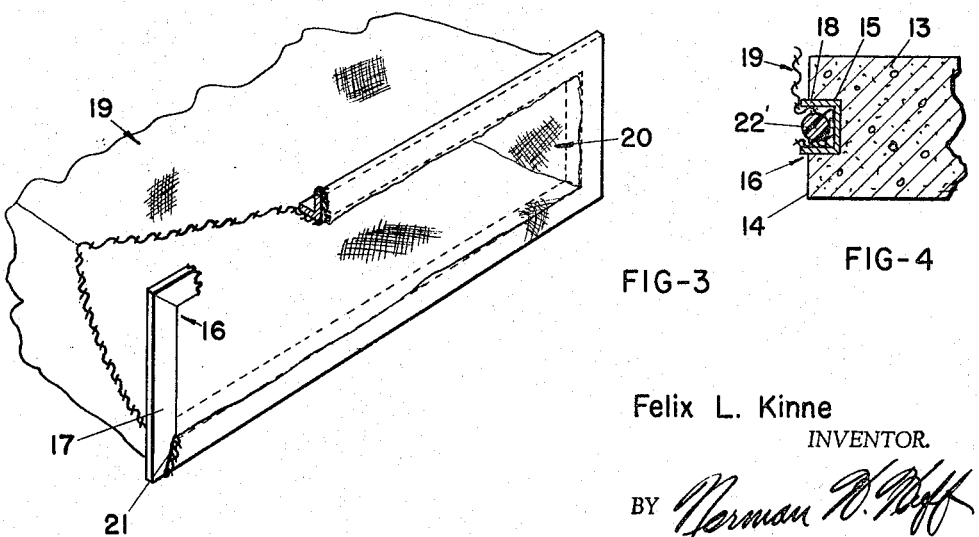
Felix L. Kinne
       INVENTOR.
BY Norman W. Wolf

United States Patent Office 3,282,430
Patented Nov. 1, 1966

3,282,430
IRRIGATION CHANNEL WEED SEED SCREEN
Felix L. Kinne, Box 1197, Quincy, Wash.
Filed Aug. 16, 1963, Ser. No. 302,526
7 Claims. (Cl. 210—162)

My present invention relates broadly to the art of irrigation of the type where irrigation water flows in systems and more particularly to a weed screen for removing weed seeds and the like from flowing water in systems to preclude undesirable scattering of noxious weed seeds over a crop area.

In areas of our country, as for example the Columbia Basin area, where irrigation is accomplished by conducting water through systems having channels and rills from larger canals, such debris gets into the irrigation water by the normal dropping of seeds by weeds growing along the canals and systems, and by the wind blowing seeds and other debris into the systems. In many instances the water received from the canal is transported in channels and/or in underground pipes where its discharge is controlled by means of conventional plumbing or irrigating fixtures including valves and other fittings.

While the unwanted propagation of noxious weeds is of primary concern it will be appreciated that other debris will cause plugging of the flow control valves thus varying their discharge and resulting in undesirable variations in the quantity of water applied to various irrigated areas.

Heretofore, planar sieves or screens have been employed to rid the irrigating water of these weed seeds and debris but in the main have been ineffective because of the requirement for continued attention by an operator; the lack of which results ultimately in a complete failure of the screening process.

My present invention provides means for screening weed seeds and the like from water flowing in an irrigation system, which means requires very little attention and may be conceived as being automatically adaptable to the changing flow conditions that arise throughout a day while irrigating, so that attention by an operator is required only occasionally depending upon the quantity of weeds, seeds and debris in the irrigating water.

It is an object of the present invention to provide means for screening weed seeds and the like from water flowing in an irrigation system which means has a large capacity for collection of weed seeds and debris, so that it requires very little attention.

It is another object of the present invention to provide means for screening weed seeds and the like from water flowing in an irrigation system which means includes a sack having a body of sieving mesh material through which all of the flowing water passes.

Yet another object of the present invention lies in the provision in an irrigation system of a sack for screening weed seeds and the like from the water flowing in the system and through the sack wherein the sack is supported upon a reticulate surface so that water may flow through the sieving mesh of the sack without obstruction by any surface exterior of the sack.

In the accompanying drawings I have shown a preferred form of the present invention but it is to be understood that the drawings are exemplifying only and are not intended to limit the invention to these structures disclosed but I desire to secure to myself the invention in its broadest possible concept limited only by the scope of the appended claims.

In the drawings like numerals are employed to designate like parts throughout the several views and;

FIGURE 1 is a fragmentary perspective view of one type of irrigation system;

FIGURE 2 is a longitudinal section taken on a vertical plane of the system of FIGURE 1;

FIGURE 3 is an enlarged fragmentary perspective view of the mouth of a screening sack and having portions broken away for convenience of illustration; and FIGURE 4 is an enlarged fragmentary horizontal section showing a modified screening sack flange.

Referring now more particularly to the drawing I have shown an irrigation ditch of conventional construction which is indicated in its entirety by the numeral 10. Customarily irrigation systems having a channel include in their channels one or more weirs 11 having adjustable flow control boards or blades (not shown) by means of which the quantity of irrigating water is selectively controlled.

A flow direction means is indicated by the numeral 13 and constitutes a wall defining a rectangular opening 14 which, is open along its upper edge. The opening 14 has a flange-receiving groove 15 in the other three edges the purpose of which will be subsequently seen.

In the present illustration the measurement of the rectangular opening 14 is approximately 28″ x 10″. While this dimension is not critical it is convenient to use to accomodate the standard size of material constituting the sieving mesh material.

A rectangular frame 16 is fabricated from angle material 17 as seen in FIGURE 3 or channel material 18 as seen in FIGURE 4 and constitutes a flange which mates with the groove 15 of wall 13 to anchor the sack 19 of the weed screen to the wall 13. Thus all of the water flowing through the opening 14 will pass into the sack and all of the foreign material such as weed seeds and the like carried by the water will be sieved from the water that passes through the sieving mesh material.

The material available for forming the sack 19 is preferably a flexible material which is substantially chemical inert with respect to irrigating water and air. Plastic fabrics having a mesh of from 30 to 40 are admirably adapted for this use. Preferably the size of the openings in the material will approximate .0164 inches, but obviously this may vary as the size of the weed seeds and debris peculiar to a specific area dictate the size of openings required in the fabric sieving mesh material. This material is available on the open market in various sizes. A standard width of 36 inches is conveniently employed by folding the material lengthwise upon itself and by means of a standard sewing machine stitching approximately ½ inch from its edges to form a sack having an open mouth 20. The fabric defining the mouth is passed through the frame 16 and secured thereto in one of a number of acceptable manners. As shown in FIGURE 3 the fabric is secured by a water proof adhesive at 21. As shown in FIGURE 4 the fabric is attached to the frame 16 by being frictionally retained within the channel member 18 by a resilient ring 22'. To provide ample area for flow of water the sack may be elongated to any measurement necessary and still maintain sufficiently small openings in the mesh to insure sieving or straining out all weed seeds and the like without materially restricting flow of the irrigation water.

With conventional planar weed screens even though they may be moved from the perpendicular to an angular position nearing the horizontal the sieving function is less efficient than desirable. Weed seeds and debris carried by the water may be classified in three general classifications: Those that float, those that are of substantially the same specific gravity as the water, and those that are heavier than water. The heavier than water seeds and the like are caused by frictional engagement of moving water to move along the bottom of the ditch and deposit along the bottom of the screens. In a vertically disposed planar screen the other debris will progressively plug the openings in the entire screen surface through which the water is flowing thus causing the elevation of the water to rise and if not properly maintained by periodically removing the accumulation upon the screen the level of the water ultimately flows over the screen and the screening process is destroyed and furthermore it washes debris accumulation back into the system. In screens where the planar screen is disposed at an angle close to horizontal that portion of water that fails to pass through the screen but over the screen carries the floating debris and some of the water borne seeds over the screen instead of passing through. With the present invention the area of the screening material is increased to such a degree that no plugging is experienced because the water can flow out of the sack through all of its walls wherever necessary without destroying its sieving or water screening function.

To facilitate this I provide a reticulate support 22 and thus the sack is supported without any restriction to flow externally of the sack. This may take the form of the table shown at 23 having depending legs which support the reticulate portion 22 above the lower or downstream bottom surface 24 of the two level channel 10. The functional equivalent may be obtained by supporting the reticulate support 22 in the side walls of the system and having the grade of the channel sufficient to provide water flow clearance out the bottom wall of the sacket 19.

The reticulate support may be fabricated from expanded metal or be otherwise provided, it being understood that any equivalent support adapted to permit free egress of the water from the bottom wall of the sack will suffice.

When the debris collects on the bottom wall of the sack, a stiff bristle brush is used to dislodge it and agitate the water whereupon the debris is carried to the downstream end of the sack by the flow of water. This materially increases the service life between the times when the sack must be emptied.

Having thus described by present invention I desire to secure by Letters Patent of the United States the following:

1. An irrigation system having means for screening weed seeds and the like from water flowing in said system, comprising: an irrigation channel,
   means in said channel including an aperture for directing the full flow of water in said channel through said aperture;
   a sack of sieving mesh material having an open mouth;
   means communicating said mouth and said aperture to effect said flow of water into said sack, whereby to catch said weed seeds and the like as said water flows through said sack.

2. An irrigation system having means for screening weed seeds and the like from water flowing in said system, comprising: an irrigation channel,
   means in said channel including an aperture for directing the full flow of water in said channel through said aperture;
   a reticulate support spaced above the bottom of said channel downstream and adjacent to said aperture;
   a sack of sieving mesh material having an open mouth communicating with said aperture; and
   said sack being supported upon said support.

3. An irrigation system having means for screening weed seeds and the like from water flowing in said system, comprising: an irrigation channel,
   means including an aperture for directing the full flow of water in said channel through said aperture;
   a sack of sieving material having an open mouth communicating with said aperture; and
   means in said channel imparting substantially no resistance to flow of water from said sack supporting said sack spaced from the channel.

4. An irrigation system having means for screening weed seeds and the like from water flowing in said system, comprising: an irrigation channel,
   a sack of sieving material communicating with said channel to receive and pass through the material thereof the full flow of water in said channel;
   said sieving material being a mesh selected from between 30 and 40 mesh and substantially chemically inert with respect to irrigating water.

5. An irrigation system having means for screening weed seeds and the like from water flowing in the irrigation system, comprising an irrigation channel,
   an elongated sack formed with a body of sieving material and means in said channel to communicate said sack with said channel to receive and pass therethrough the full flow of water in said channel; said channel being formed with a bottom wall which is at a lower elevation downstream; and
   means supporting the body of said sack in upwardly spaced relation to the downstream bottom wall of said channel.

6. The invention defined in claim 5 and further characterized by said last-named means, comprising:
   an expanded metal surface fixed in said channel spaced upwardly of said downstream bottom wall, whereby to admit water flowing through all of its body as required by the water-flow quantity.

7. An irrigation system having means for screening weed seeds and the like from water flowing in said system, comprising: an irrigation channel,
   a wall in said channel having a geometric opening therein for diverting water flowing in said channel through said opening;
   said wall having a groove defining said opening;
   a sack of sieving material having an open mouth defined by a rigid flange coincident in shape and mating with said groove to releasably secure said sack to said wall to receive into said sack all of the water flowing through said opening; and
   said sack being supported for admitting of water flow through at least part of its sieving material.

References Cited by the Examiner

UNITED STATES PATENTS

| 1,128,510 | 2/1915 | Quist | 55—378 X |
| 1,709,291 | 4/1929 | Vidler | 210—242 X |

FOREIGN PATENTS 1,195,948　5/1959　France.

REUBEN FRIEDMAN, *Primary Examiner.*

D. M. RIESS, *Assistant Examiner.*